No. 887,966. PATENTED MAY 19, 1908.
W. G. SCHAEFFER.
MOTOR CYCLE.
APPLICATION FILED OCT. 8, 1906.

William G. Schaeffer, Inventor

Witnesses by

Attorney

UNITED STATES PATENT OFFICE.

WILLIAM G. SCHAEFFER, OF READING, PENNSYLVANIA, ASSIGNOR, BY MESNE ASSIGNMENTS, TO READING STANDARD COMPANY, A CORPORATION OF PENNSYLVANIA.

MOTOR-CYCLE.

No. 887,966.  Specification of Letters Patent.  Patented May 19, 1908.

Application filed October 8, 1906. Serial No. 337,868.

*To all whom it may concern:*

Be it known that I, WILLIAM G. SCHAEFFER, a citizen of the United States, and a resident of the city of Reading, in the county of Berks, State of Pennsylvania, have invented certain new and useful Improvements in Motor-Cycles, of which the following is a specification.

This invention relates to that class of motor-propelled vehicles, commonly described as motor cycles, in which the pedal drive mechanism commonly employed in bicycles and tricycles, is combined with a motor drive mechanism. In this type of machine the motor is commonly arranged to drive the rear wheel indirectly through intermediate sprockets connected by separate drive chains to the motor shaft and rear wheel respectively; the pedal shaft being directly connected to the latter by an independent chain which is practically in service only for starting the machine. The wear and stretch of the starting and driving chains being very unequal, owing to the widely differing strains and service to which they are subjected, it is a matter of great practical importance that provision be made for properly adjusting the length of each chain as its particular wear and stretch call for.

With this object in view my invention consists in forming the bicycle frame with separate hangers for the pedal-shaft and the sprocket countershaft, in providing the same with independent adjusting means, and in suitably locating the motor relative to said hangers, all as fully described hereafter in connection with the accompanying drawings, and the novel features of which are specifically pointed out in the claims.

Figure 1:
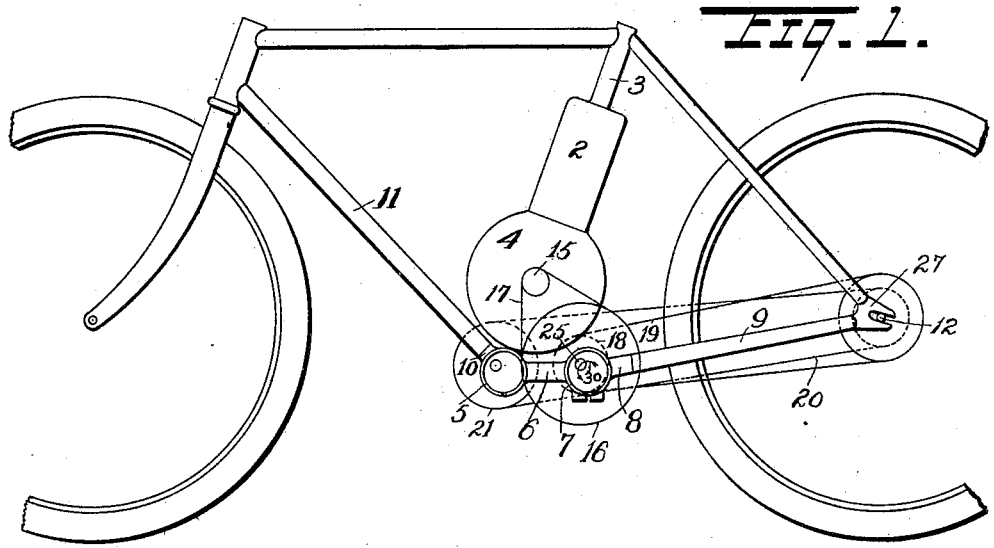
Figure 2:
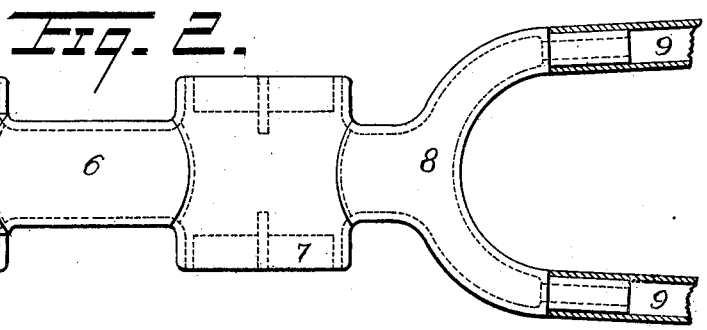
Figure 3:
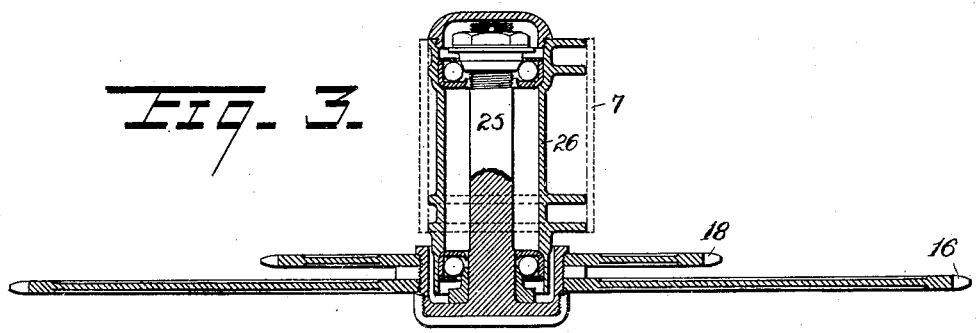

Figure 1 is a diagrammatic side elevation of a motor-bicycle embodying my invention. Fig. 2 is a separate enlarged view of the hanger-bar showing clearly the spaced-apart shells with the integrally formed projections thereon. Fig. 3 is a sectional detail indicating a means of adjustably carrying the countershaft sprockets in their hanger.

The drawing indicates an ordinary diamond frame bicycle provided with a motor 2, the latter being shown arranged to serve as a portion of the seat-post 3, and the crank-casing 4 of the motor being attached in well known manner to the pedal-shaft hanger 5. The frame construction indicated, further differs from the ordinary only so far as the lower rear-fork member is concerned; this member, in my improved construction, preferably comprising a hanger-bar portion 6 formed with a second hanger-shell 7 located rearward of the pedal-shaft hanger 5; and with forked extension 8 from said shell 7 adapted for connection of the tubular fork ends 9, 9 and a tube-connecting projection 10 from said hanger-shell 5 for uniting thereto the lower front member 11 of the frame.

The hangers 5 and 7, as shown, are arranged approximately in a line extending to the rear-wheel axis 12; and the rearward hanger 7 is adapted to serve as the countershaft hanger, the motor shaft sprocket 15 driving the countershaft sprocket 16 by chain 17, and the countershaft sprocket 18 driving the rear wheel by chain 19. This drive chain 19 thus runs in the same direction as the starting chain 20 extending to the rear wheel from the pedal-shaft sprocket 21, while the motor shaft is located above the countershaft hanger 7 so that the direction of the chain 17 is crosswise or approximately at right angles to the direction of the chain 19.

To provide for adjustment of the horizontal drive chain 19, and also of the crosswise motor chain 17, the sprockets 16 and 18, as shown in Fig. 3, are jointly fixed to a countershaft 25, which is eccentrically mounted in a bearing-hub 26 fitted to the hanger-shell 7 and arranged to be adjustably clamped in the latter as indicated in Fig. 1. Independent adjustment of the starting chain 20 may be provided for by similarly mounting the pedal shaft in the hanger 5, while the rear wheel axis is adjustably secured as usual to the rear end 27 of the frame.

In the improved construction described the varying slack of each of the chains may be readily taken up with absolute accuracy as follows: As indicated in Fig. 1 the sprocket countershaft 25 for the drive chains 17 and 19, is capable of adjustment in an arc 30 about the center of the hanger-shell 7, so that rotary movement of the bearing-hub 26 in the direction indicated by the arrow will throw the countershaft both rearward and downward so as to tighten the chains 19 and 17. The relative rearward and downward movements are such as to ordinarily adjust both chains properly, but in case one or other should still be slack, the rear wheel is adjusted in connection with the countershaft adjustment so as to equalize the tension on both the chains 17 and 19. The starting chain, obviously, is independently adjusted as required by means of the adjustable pedal shaft mounting in the hanger 5, so that all the chains may be continued in service indefinitely with absolute avoidance of undue slack in any one of them notwithstanding the great difference in strains and service to which they are naturally subjected.

The preferred construction specifically shown and described may evidently be modified without departing from the invention.

What I claim is:—

A motor cycle having a frame of substantially diamond shape, the seat-post of which is formed in part by the cycle-motor, and the lower rear-fork member of which comprises a hanger bar formed with spaced-apart pedal-shaft and countershaft hangers and tube-connecting projections on said hangers respectively for the lower front bar and the fork ends, and sprocket wheels for the motor and rear-wheel chains eccentrically mounted in the countershaft hanger so as to be jointly adjustable for simultaneously taking up wear of both of said chains substantially as set forth.

In testimony whereof, I affix my signature, in the presence of two witnesses.

WILLIAM G. SCHAEFFER.

Witnesses:
   D. M. STEWART,
   W. G. STEWART.